United States Patent
Liu et al.

(12)

(10) Patent No.: US 11,797,607 B2
(45) Date of Patent: Oct. 24, 2023

(54) METHOD AND APPARATUS FOR CONSTRUCTING QUALITY EVALUATION MODEL, DEVICE AND STORAGE MEDIUM

(71) Applicant: BEIJING BAIDU NETCOM SCIENCE AND TECHNOLOGY CO., LTD., Beijing (CN)

(72) Inventors: Huan Liu, Beijing (CN); Mingquan Cheng, Beijing (CN); Kunbin Chen, Beijing (CN); Zhun Liu, Beijing (CN); Bolei He, Beijing (CN); Wei He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 349 days.

(21) Appl. No.: 17/211,612

(22) Filed: Mar. 24, 2021

(65) Prior Publication Data
US 2021/0209421 A1 Jul. 8, 2021

(30) Foreign Application Priority Data
Jun. 22, 2020 (CN) .......................... 202010573822.4

(51) Int. Cl.
*G06F 16/901* (2019.01)
*G06F 18/21* (2023.01)
(Continued)

(52) U.S. Cl.
CPC .......... *G06F 16/901* (2019.01); *G06F 18/217* (2023.01); *G06F 18/253* (2023.01);
(Continued)

(58) Field of Classification Search
CPC ...... G06F 40/30; G06F 18/253; G06F 18/217; G06T 7/0002
See application file for complete search history.

(56) References Cited

U.S. PATENT DOCUMENTS

| 8,378,608 B2 * | 2/2013 | Robertson | H02M 5/4505 |
| | | | 318/729 |
| 2009/0297048 A1 * | 12/2009 | Slotine | G06V 10/7715 |
| | | | 382/224 |

(Continued)

FOREIGN PATENT DOCUMENTS

JP 2019-109664 A 7/2019

OTHER PUBLICATIONS

Aili Shen, Bahar Salehi, Timothy Baldwin, Jianzhong Qi, A Joint Model for Multimodal Document Quality Assessment, 2019, ACM/IEEE Joint Conference on Digital Libraries (JCDL) (Year: 2019).*

(Continued)

*Primary Examiner* — Kevin Ky
(74) *Attorney, Agent, or Firm* — Seed IP Law Group LLP

(57) ABSTRACT

Embodiments of the present disclosure disclose a method and apparatus for constructing a quality evaluation model, an electronic device and a computer-readable storage medium. A specific implementation mode of the method comprises: acquiring samples of knowledge contents; extracting statistical features, semantic features, and image features respectively from the samples of knowledge contents; and constructing a quality evaluation model for knowledge according to the statistical features, the semantic features, and the image features. On the basis of the prior art, this implementation mode additionally uses semantic features and image features of knowledge contents to construct a more accurate quality evaluation model based on multi-dimensional features that characterize the actual quality of a knowledge, which may well discover some brief but very useful summary knowledge in an enterprise and may recommend high-quality knowledge more accurately for employees in the enterprise.

11 Claims, 4 Drawing Sheets

(51) Int. Cl.
    *G06F 18/25*     (2023.01)
    *G06F 18/2132*     (2023.01)
    *G06F 40/30*     (2020.01)
    *G06T 7/00*     (2017.01)
    *G06V 30/413*     (2022.01)
    *G06V 30/40*     (2022.01)
    *G06V 30/18*     (2022.01)
    *G06V 30/19*     (2022.01)
    *G06V 10/82*     (2022.01)
    *G06V 30/10*     (2022.01)

(52) U.S. Cl.
    CPC ............ *G06F 40/30* (2020.01); *G06T 7/0002* (2013.01); *G06V 10/82* (2022.01); *G06V 30/18057* (2022.01); *G06V 30/19173* (2022.01); *G06V 30/40* (2022.01); *G06V 30/413* (2022.01); *G06F 18/2132* (2023.01); *G06T 2207/30168* (2013.01); *G06T 2207/30176* (2013.01); *G06V 30/10* (2022.01)

(56) References Cited

U.S. PATENT DOCUMENTS

| | | | |
|---|---|---|---|
| 2010/0021885 A1* | 1/2010 | Fielden | G01N 33/57438 435/6.13 |
| 2012/0004854 A1* | 1/2012 | Fernandez | G16B 20/20 436/64 |
| 2012/0277999 A1* | 11/2012 | Somogyi | C12Q 1/6883 506/16 |
| 2012/0321140 A1* | 12/2012 | Xiong | G06V 10/774 382/108 |
| 2014/0247965 A1* | 9/2014 | Van Wesep | G06V 30/412 382/103 |
| 2018/0018579 A1* | 1/2018 | Xu | G06N 20/20 |
| 2019/0095961 A1* | 3/2019 | Wu | G06Q 30/0255 |
| 2019/0130444 A1* | 5/2019 | Fei | G06F 16/437 |
| 2020/0015764 A1* | 1/2020 | Brooks | A61B 6/505 |
| 2020/0402660 A1* | 12/2020 | Chakravarthy | G16H 50/30 |

OTHER PUBLICATIONS

Extended European Search Report for European Application No. 21166280.4, dated Sep. 21, 2021, 13 pages.

Shen et al., "A Joint Model for Multimodal Document Quality Assessment," School of Computing and Information Systems, The University of Melbourne, Victoria, Australia, Jan. 14, 2019, 9 pages.

* cited by examiner

METHOD AND APPARATUS FOR CONSTRUCTING QUALITY EVALUATION MODEL, DEVICE AND STORAGE MEDIUM

CROSS-REFERENCE TO RELATED APPLICATIONS

This application claims priority to Chinese Patent Application No. 202010573822.4, filed with the China National Intellectual Property Administration (CNIPA) on Jun. 22, 2020, the contents of which are incorporated herein by reference in their entirety.

TECHNICAL FIELD

Embodiments of the present disclosure relate to the technical field of data processing, particularly, to the technical fields of artificial intelligence, deep learning, natural language processing, and image processing, and more particularly to a method and apparatus for constructing a quality evaluation model, an electronic device and a computer-readable storage medium.

BACKGROUND

With the development of an enterprise, more and more document knowledge is accumulated in the enterprise, including a lot of high-quality knowledge which is helpful to improve the skills of the employees. In order to make the knowledge flow efficiently in the enterprise, a knowledge recommendation system in the enterprise needs to be constructed to make the knowledge actively available to the employees. However, the number of the internal documents in the enterprise is huge and quality of contents of these documents is uneven. If the quality is not controlled for recommendation of the documents, it is very inappropriate to recommend a lot of low-quality and invalid knowledge to the employees of the enterprise, thus it is very important to control the threshold for accessing the recommended knowledge.

The prior art provides a scheme for evaluating knowledge quality based on statistical features of knowledge, and recommending high-quality knowledge for employees based on the evaluated knowledge quality.

SUMMARY

Embodiments of the present disclosure provide a method and apparatus for constructing a quality evaluation model, an electronic device and a computer-readable medium.

In a first aspect, embodiments of the present disclosure provide a method for constructing a quality evaluation model, comprising: acquiring samples of knowledge contents, wherein the samples of knowledge contents comprises knowledge documents expressed in at least one form of texts, images, and tables; extracting statistical features, semantic features, and image features respectively from the samples of knowledge contents; and constructing a quality evaluation model for knowledge according to the statistical features, the semantic features, and the image features.

In a second aspect, embodiments of the present disclosure provide an apparatus for constructing a quality evaluation model, comprising: a samples of knowledge contents acquisition unit, configured to acquire samples of knowledge contents, wherein the samples of knowledge contents comprises knowledge documents expressed in at least one form of texts, images, and tables; a multi-feature extraction unit, configured to extract statistical features, semantic features, and image features respectively from the samples of knowledge contents; and a quality evaluation model construction unit, configured to construct a quality evaluation model for knowledge according to the statistical features, the semantic features, and the image features.

In a third aspect, embodiments of the present disclosure provide an electronic device, comprising: one or more processors; and a memory, storing one or more programs, wherein the one or more programs, when executed by the one or more processors, cause the one or more processors to implement the method for constructing a quality evaluation model provided by the first aspect.

In a forth aspect, embodiments of the present disclosure provide a computer-readable medium, storing a computer program thereon, wherein the program, when executed by a processor, causes the processor to implement the method for constructing a quality evaluation model provided by the first aspect.

According to the method and apparatus for constructing a quality evaluation model, the electronic device and the computer-readable storage medium provided by the embodiments of the present disclosure, first, samples of knowledge contents is acquired, wherein the samples of knowledge contents comprises knowledge documents expressed in at least one form of texts, images, and tables; then, statistical features, semantic features, and image features are extracted from the samples of knowledge contents; and finally, a quality evaluation model for knowledge is constructed according to the statistical features, the semantic features, and the image features.

On the basis of the prior art, the embodiments of the present disclosure additionally use semantic features and image features of knowledge contents to construct a more accurate quality evaluation model based on multi-dimensional features that characterize the actual quality of a knowledge, which may well discover some brief but very useful summary knowledge in an enterprise and may recommend high-quality knowledge more accurately for employees in the enterprise.

It should be understood that the content described in this section is neither intended to identify key or important features of the embodiments of the present disclosure, nor intended to limit the scope of the present disclosure. Other features of the present disclosure will become understandable through the following description.

BRIEF DESCRIPTION OF THE DRAWINGS

After reading detailed descriptions of non-limiting embodiments with reference to the following accompanying drawings, other features, objectives and advantages of embodiments of the present disclosure will become more apparent.

DETAILED DESCRIPTION OF EMBODIMENTS

Embodiments oft present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The embodiments of present disclosure will be described below in detail with reference to the accompanying drawings and in combination with the embodiments.

Figure 1:
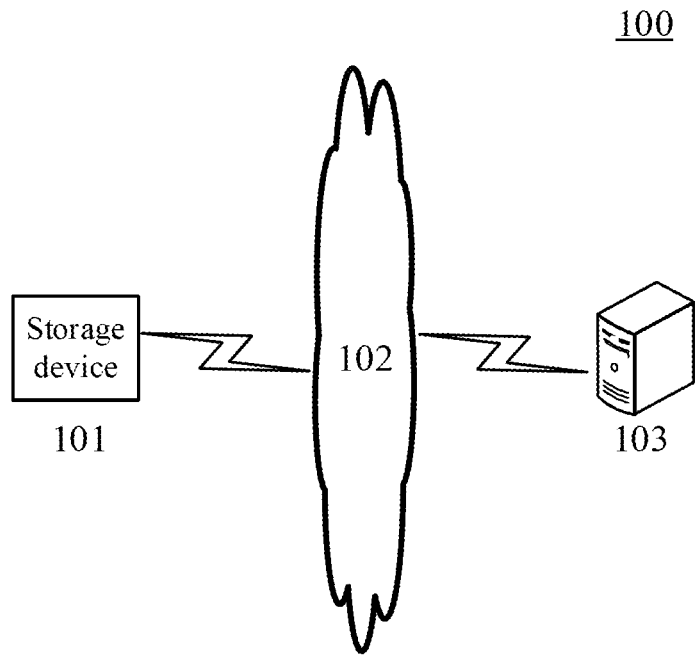
FIG. 1 is an exemplary system architecture to which an embodiment of the present disclosure may be applied.

FIG. 1 shows an exemplary system architecture 100 to which embodiments of a method and apparatus for constructing a quality evaluation model, an electronic device and a computer-readable storage medium according to embodiments of the present disclosure may be applied.

As shown in FIG. 1, the system architecture 100 may comprise a storage device 101, a network 102, and a server 103. The network 102 serves as a medium providing a communication link between the storage device 101 and the server 103. The network 102 may comprise various types of connections, such as wired or wireless communication links, or optical fiber cables.

The server 103 may exchange data with the storage device 101 storing various types of data through the network 102 to obtain certain required data or issue certain instructions. The storage device 101 and the server 103 may be installed with various applications for implementing information communication between the two, such as sample knowledge transmission applications, quality evaluation model construction applications, and knowledge recommendation applications.

The storage device 101 and the server 103 may be hardware or software. When the storage device 101 is hardware, it may be various electronic devices with a display screen, including but not limited to a smart phone, a tablet computer, a laptop computer, and a desktop computer. When the storage device 101 is software, it may be installed in the electronic devices listed above, and may be implemented as a plurality of software programs or software modules, or as a single software program or software module, which is not specifically limited here. When the server 103 is hardware, it may be implemented as a distributed server cluster composed of a plurality of servers, or as a single server. When the server is software, it may be implemented as a plurality of software programs or software modules, or as a single software program or software module, which is not specifically limited here.

The server 103 may provide various services through various built-in applications. Taking a knowledge recommendation application that may provide knowledge quality evaluation services as an example, the server 103 may achieve the following effects when running the knowledge recommendation application: first, acquiring samples of knowledge contents from the storage device 101 via the network 102, wherein the samples of knowledge contents comprises knowledge documents expressed in at least one form of texts, images, and tables; then, extracting statistical features, semantic features, and image features from the samples of knowledge contents; next, constructing a quality evaluation model for knowledge according to the statistical features, the semantic features, and the image features; and finally, evaluating the actual quality of newly generated knowledge contents according to the constructed quality evaluation model, and recommending high-quality knowledge therein to users according to the actual quality.

It should be pointed out that the samples of knowledge contents used to extract various features may be directly acquired from the storage device 101 via the network 102, and may also be directly stored or pre-pulled to the server 103 locally in various ways. When the server 103 detects that the samples of knowledge contents has been stored locally, it may choose to directly acquire the data locally. In this case, the exemplary system architecture 100 may not comprise the storage device 101 and the network 102.

Since the construction of a model usually takes up many computing resources and strong computing capabilities, the methods for constructing a quality evaluation model provided in subsequent embodiments of the present disclosure are usually executed by the server 103 with strong computing capabilities and many computing resources. Correspondingly, the apparatus for constructing a quality evaluation model is usually configured in the server 103. However, it should also be pointed out that when the storage device 101 also has computing capabilities and computing resources that meet certain requirements, the storage device 101 may also complete all or some of computations done by the server 103 via quality evaluation model construction applications and/or knowledge recommendation applications installed thereon, so as to help the server 103 take part of the pressure as much as possible, especially when the server 103 is currently under heavy load. When the storage device 101 may undertake all operations in the method for constructing a quality evaluation model, the apparatus for constructing a quality evaluation model may also be configured in the storage device 101. In this case, the exemplary system architecture 100 may also not comprise the server 103 and the network 102.

It should be understood that the numbers of the storage device, the network, and the server in FIG. 1 are merely illustrative. Any number of storage devices, networks and servers may be configured according to actual requirements. In addition, while the storage device has storage capability, it usually also has varying degrees of computing capabilities according to actual situations, rather than just having the storage capability.

Figure 2:
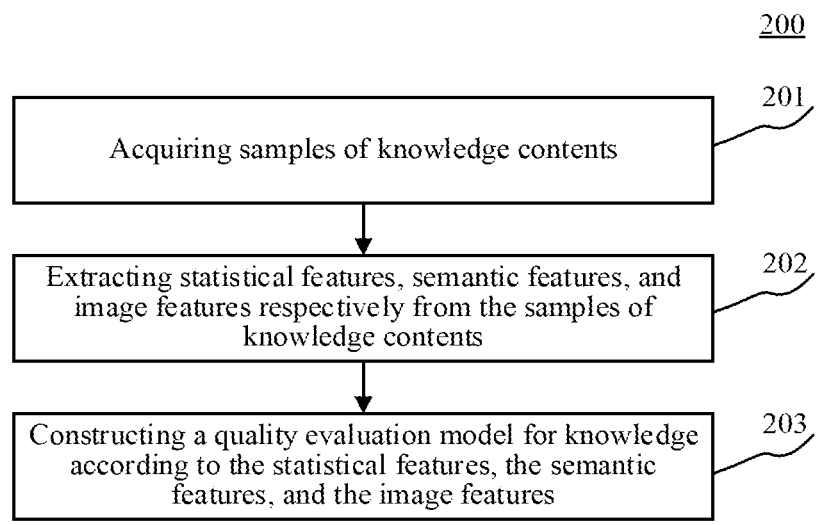
FIG. 2 is a flowchart of a method for constructing a quality evaluation model according to an embodiment of the present disclosure.

Continuing to refer to FIG. 2, FIG. 2 is a flowchart of a method for constructing a quality evaluation model according to an embodiment of the present disclosure. The flow 200 comprises the following steps:

Step 201: acquiring samples of knowledge contents.

The purpose of this step is to acquire the samples of knowledge contents by the execution body (for example, the server 103 shown in FIG. 1) of the method for constructing a quality evaluation model. The samples of knowledge contents is used as training samples for training a quality evaluation model. Specifically, the samples of knowledge contents comprises knowledge documents expressed in at least one form of texts, images, and tables. In order to expand the applicable scenarios of the trained quality evaluation model as much as possible, the samples of knowledge contents may comprise not only internal knowledge of an enterprise, but also external knowledge of the enterprise, so as to obtain a quality evaluation model that may evaluate the quality of the internal knowledge of the enterprise and evaluate the quality of the external knowledge of the enterprise to recommend both external and internal high-quality knowledge to employees in the enterprise.

For the internal knowledge of the enterprise, the samples of knowledge contents that is suitable as training samples may be screened based on manual annotations of knowledge or additional labels, or automatically screened through other pre-designed automatic screening schemes. The basis of automatic screening is deep understanding of the characteristics of various types of internal knowledge of the enterprise. For example, the internal knowledge of the enterprise may be simply divided into a recording nature and a non-recording nature according to its nature. The knowledge of the recording nature refers to the knowledge that records all performed operations in the form of logs, and its core purpose is to "record" the content obtained only to meet service requirements. The knowledge of the non-recording nature is more inclined to "summary", "refinement" and "sublimation", and it has obvious purpose and clearly elaborates or explains a detail or a solution. Therefore, when the samples of knowledge contents is obtained by means of an automatic screening mechanism, the implementation of automatic screening may be formulated according to the features of the knowledge of the non-recording nature, so as to improve the efficiency as much as possible.

Specifically, in order that the trained quality evaluation model may accurately evaluate the actual quality of knowledge based on the quality of the knowledge, the samples of knowledge contents may be controlled to be composed of positive samples and negative samples in a certain ratio, so as to provide more comprehensive guidance from both positive and negative aspects.

It should be pointed out that the samples of knowledge contents may be acquired by the execution subject directly from a local storage device, or from a non-local storage device (for example, the storage device 101 shown in FIG. 1). The local storage device may be a data storage module configured in the execution subject, such as a hard disk of the server, and in this case, the samples of knowledge contents may be quickly read locally. The non-local storage device may also be any other electronic device configured to store data, such as some user terminals, and in this case, the execution subject may acquire the required samples of knowledge contents by sending an acquisition command to the electronic device.

Step 202: extracting statistical features, semantic features, and image features respectively from the samples of knowledge contents.

On the basis of step 201, this step is intended to extract statistical features, semantic features, and image features respectively from the samples of knowledge contents by the execution subject. The statistical features of the knowledge contents refer to features unrelated to the meaning expressed by the knowledge content, such as length, the number of characters (Chinese characters, English characters, and special characters), the number of punctuation marks, the number of paragraphs, the number of pages, the number of tables, and the number of images; the semantic features of the knowledge contents refer to features related to the meaning expressed by the knowledge content, such as emotional tendency, the domain to which it belongs, the degree of sentence smoothness, and whether it involves sensitive topics (current politics topics); and the image features of the knowledge contents mainly refer to knowledge expressions in the forms of images, tables, and the like.

Since the purpose of embodiments of the present disclosure is to construct a quality evaluation model for recommending high-quality knowledge to users, embodiments of the present disclosure extracts statistical features, semantic features, and image features respectively through this step to accurately evaluate the actual quality of knowledge from multiple dimensions. The statistical features provide quality evaluation references from the aspects of length, structure, format and the like of the knowledge, for example, the length is usually positively related to quality; the semantic features provide quality evaluation references from the meaning of the knowledge, the ability to express problems and ideas, the number of wrongly written or mispronounced characters, and the like, the more fluent the sentence, the stronger the expression ability, usually the higher the quality; and the image features provide quality evaluation references from the expression forms of the knowledge, for example, if the more expression forms (such as tables, statistical graphs, images) other than text are, its quality is usually higher. In general, the quality of the knowledge is usually positively related to the effort and concentration spent by the knowledge editor. The above three features may evaluate the effort and concentration spent by the editor from different levels, and cover as many aspects as possible.

Step 203: constructing a quality evaluation model for knowledge according to the statistical features, the semantic features, and the image features.

On the basis of step 202, this step is intended to construct a quality evaluation model for knowledge according to the statistical features, the semantic features, and the image features by the execution subject, that is, multiple types of features extracted from the samples of knowledge contents are used as training samples, so that the initial quality evaluation model better discovers the features of distinguishing high-quality knowledge and low-quality knowledge in iterative training, and a usable quality evaluation model is finally obtained by training.

Further, after the usable quality evaluation model is constructed, the quality evaluation model may also be used to evaluate the actual quality of newly generated knowledge content, and the newly generated knowledge contents whose actual quality exceeds a preset quality is recommended as high-quality knowledge. The preset quality is a critical value to measure whether a piece of knowledge belongs to high-quality knowledge. An average value of the lowest value and the highest value may be selected as the preset quality, or a specific value may be used as the preset quality according to the actual situation to realize flexible evaluation.

On the basis of the prior art, the method for constructing a quality evaluation model according to the embodiment of the present disclosure additionally uses semantic features and image features of knowledge contents to construct a more accurate quality evaluation model based on multi-dimensional features that characterize the actual quality of a knowledge, which may well discover some brief but very useful summary knowledge in an enterprise and may recommend high-quality knowledge more accurately for employees in the enterprise.

Figure 3:
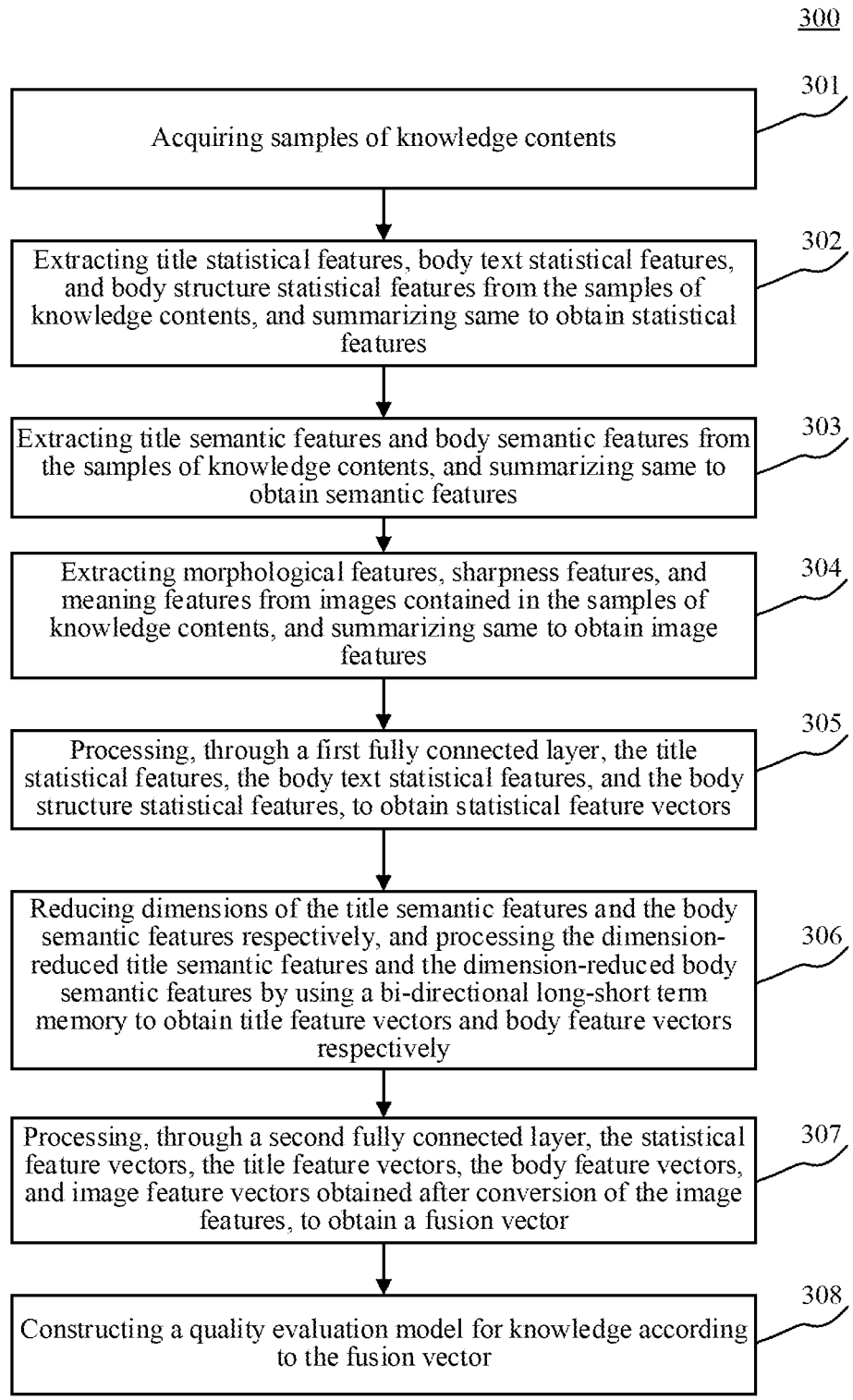
FIG. 3 is a flowchart of another method for constructing a quality evaluation model according to an embodiment of the present disclosure.

Referring to FIG. 3, FIG. 3 is a flowchart of another method for constructing a quality evaluation model according to an embodiment of the present disclosure. The flow 300 comprises the following steps:

Step 301: acquiring samples of knowledge contents.

Step 302: extracting title statistical features, body text statistical features, and body structure statistical features from the samples of knowledge contents, and summarizing same to obtain statistical features.

This step extracts the title statistical features, the body text statistical features, and the body structure statistical features respectively by means of extraction of statistical features for a title, a body text, and a body structure in the samples of knowledge contents.

Specifically, the title statistical features may comprise the length of title characters, the length of title segmentation, whether the title contains punctuation marks, whether the title contains special symbols, the number of vocabulary contained in the title in the current field of the enterprise, the number of digits contained in the title, the number of English words in the title, and the like; the body text statistical features may comprise the length of body characters, the length of body segmentation, the number of body sentences, the number of short sentences in the body, the length of the longest sentence in the body, the number of vocabulary contained in the body in the current field of the enterprise, the proportion of Chinese and English in the body, and the like; and the body structure statistical features may comprise the number of images in the body, the number of paragraphs in the body, the number of subtitles in the body, the number of bold texts in the body, whether the body has a catalog, the number of tables in the body, the number of formulas in the body, the number of code libraries in the body, and the like.

Step 303: extracting title semantic features and body semantic features from the samples of knowledge contents, and summarizing same to obtain semantic features.

This step extracts the title semantic features and the body semantic features respectively by means of extraction of statistical features for the title and the body in the samples of knowledge contents.

At the semantic level, a complete title and each word after the title is segmented, each complete sentence in the body and each word after the complete sentence is segmented, express slightly different semantics, so in order to extract accurate semantic features as much as possible, a specific method for extracting semantic features is further provided here, including the following steps:

acquiring a complete title of the samples of knowledge contents and each complete sentence in the body;

segmenting the complete title and each complete sentence to obtain a segmented title and a segmented sentence;

performing title semantic analysis on each word in the complete title and the segmented title respectively to obtain title semantic features; and performing body semantic analysis on each word in each complete sentence and the segmented sentence respectively to obtain body semantic features.

That is, the title semantic features and the body semantic features are both composed of the complete and segmented semantic features of each word, thereby obtaining more comprehensive semantic features.

Specifically, the title semantic features comprise: emotional tendency of the title, sensitivity of the title to pornography and politics, smoothness score of the title, whether the title has wrongly written or mispronounced characters, and the like; and the body semantic features comprise: emotional tendency of the body, sensitivity of the body to pornography and politics, smoothness score of the longest sentence in the body, average smoothness score of all sentences in the body, whether the body has wrongly written or mispronounced characters, distribution of body topics, the degree of matching between the body content and the title, and the like.

Step 304: extracting morphological features, sharpness features, and meaning features from images contained in the samples of knowledge contents, and summarizing same to obtain image features.

This step specifically extracts features of morphology, sharpness, meaning, and the like for the images in the samples of knowledge contents, wherein the morphological features of an image are used to indicate the completeness of the image and whether it has been cut, the sharpness features are used to indicate the degree of difficulty in recognizing the content contained in the image, and the meaning features are used to indicate the degree of matching between the content represented by the image and the meaning expressed by the body content. In addition, whether the image is an original image may also be characterized by detecting whether the image contains a watermark.

This embodiment provides a specific method for extracting multi-dimensional features from the samples of knowledge contents through steps 302 and 303, so as to obtain comprehensive features as much as possible for evaluating knowledge quality.

Step 305: processing the title statistical features, the body text statistical features, and the body structure statistical features through a first fully connected layer to obtain statistical feature vectors.

On the basis of steps 302 to 304, this step is intended to integrate the three sub-features under the statistical features through the first fully connected layer by the execution subject, so as to obtain the statistical feature vectors that characterize the knowledge in terms of length, structure, and format.

Step 306: reducing dimensions of the title semantic features and the body semantic features respectively, and processing the dimension-reduced title semantic features and the dimension-reduced body semantic features by using a bi-directional long-short term memory to obtain title feature vectors and body feature vectors respectively.

On the basis of step 305, this step is intended to reduce the dimensions of the semantic features by the execution subject, so that the semantic features may be distinguished more prominently by means of dimension reduction, while the processing of the dimension-reduced features by the bi-directional long-short term memory (Bi-LSTM) may well avoid ignoring the correlation between different features scattered over a long period of time.

Specifically, the dimensions may be reduced by an embedding layer at the practical level. Compared with other conventional dimension reducers, the embedding layer uses a dimension reduction mode that converts discrete variables into continuous vectors, so that in the neural network, not only the spatial dimensions of the discrete variables may be reduced, but also the variables may be represented meaningfully, which facilitates subsequent processing.

Step 307: processing, through a second fully connected layer, the statistical feature vectors, the title feature vectors, the body feature vectors, and image feature vectors obtained after conversion of the image features, to obtain a fusion vector.

On the basis of step 306, this step is intended to fuse feature vectors of multiple dimensions (that is, the statistical feature vectors, the title feature vectors, the body feature vectors, and the image features) by the execution subject to obtain a fusion vector that fuses the three-dimensional features.

Step 308: constructing a quality evaluation model for knowledge according to the fusion vector.

On the basis of all the beneficial effects of the previous embodiment, this embodiment provides, through steps 302 to 304, a specific mode of extracting three-dimensional features, including as comprehensive as possible features that may be used to evaluate knowledge quality, which helps to improve the accuracy (or precision) of the subsequent quality evaluation model constructed based on this. In addition, this embodiment also provides, through steps 305 to 308, a specific scheme about how to construct the quality evaluation model based on the three-dimensional features, in which a more accurate quality evaluation model is constructed in combination with the categories of features and the applicable actual scenarios and by means of feature fusion and splicing.

It should be understood that the three-dimensional feature extraction mode provided in steps 302 to 304 may also construct a similar quality evaluation model by using a model construction mode different from that in steps 305 to 308.

Figure 4:
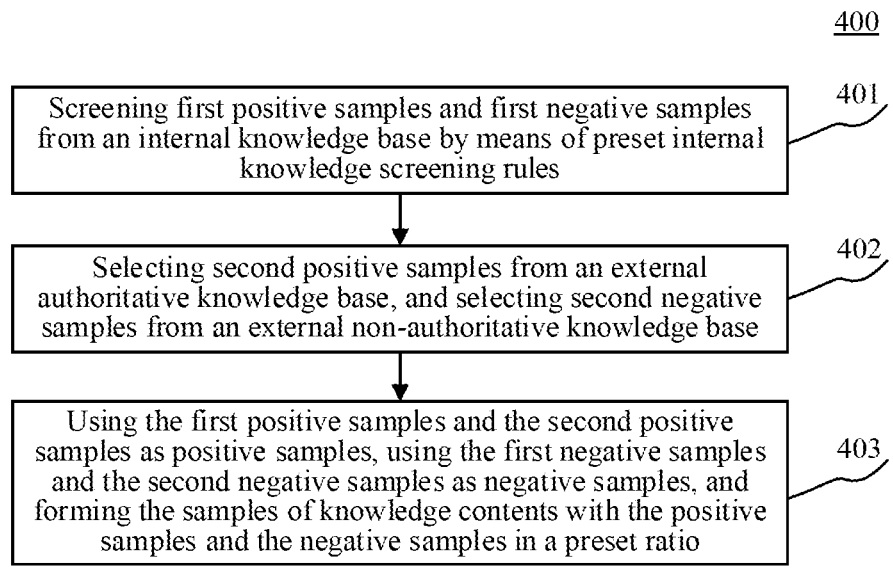
FIG. 4 is a flowchart of a method for acquiring samples of knowledge contents according to an embodiment of the present disclosure.

Referring to FIG. 4, FIG. 4 is a flowchart of a method for acquiring samples of knowledge contents according to an embodiment of the present disclosure. The flow 400 comprises the following steps:

Step 401: screening first positive samples and first negative samples from an internal knowledge base by means of preset internal knowledge screening rules.

The internal knowledge screening rules abstractly are obtained based on the differences between non-recorded internal knowledge and recorded internal knowledge. The differences may also be represented by distinguishing features. The abstraction of the rules may also be implemented by regular expressions, corresponding relationships, and discriminant models. Specific limitations are not given here.

This step is intended to screen, by the execution subject, the first positive samples and the first negative samples from the internal knowledge base by means of the preset internal knowledge screening rules, that is, to determine positive and negative samples for the internal knowledge of the enterprise.

Step 402: selecting second positive samples from an external authoritative knowledge base, and selecting second negative samples from an external non-authoritative knowledge base.

Different from step 401, this step is intended to select, by the execution subject, the positive and negative samples of external knowledge of the enterprise from the external authoritative knowledge base and the external non-authoritative knowledge base respectively. The reason why the screening rules similar to those mentioned in step 401 may not be used for automatic implementation is because less external knowledge than internal knowledge of the enterprise is understood and it is difficult to reach the level of understanding sufficient to form the rules. Therefore, this step starts with overall evaluation on the external knowledge bases of the enterprise as sources to select the positive and negative samples respectively.

Further, considering that the external non-authoritative knowledge base also has a little high-quality knowledge, in order to improve the accuracy of samples as much as possible, preset marks may also be added to the knowledge contents whose collection and reading quantities exceed preset quantities in the second negative samples, and the knowledge contents added with the preset marks is removed from the second negative samples and added to the second positive samples. Similarly, the knowledge contents with a small collection and reading quantity in the second positive samples may also be added as negative samples to the second negative samples.

The reason why the samples of knowledge contents also needs to be acquired from the external knowledge of the enterprise is because it is very necessary to introduce the external knowledge in order to expand the professional vision of employees in the enterprise with the rapid development of era. Compared with understanding deeper internal knowledge of the enterprise, because the content of external knowledge of the enterprise is not supervised by the enterprise, quality control is more necessary when the recommendations of external knowledge are introduced, otherwise, it is more prone to recommendation errors than recommending internal knowledge of the enterprise.

Step 403: using the first positive samples and the second positive samples as positive samples, using the first negative samples and the second negative samples as negative samples, and forming the samples of knowledge contents with the positive samples and the negative samples in a preset ratio.

On the basis of step 401 and step 402, this step is intended to form integrated positive samples and negative samples by summarizing the positive and negative samples from the internal knowledge of the enterprise and the external knowledge of the enterprise, and to form the samples of knowledge contents in a certain ratio, for example, the ratio of positive samples to negative samples is 2:1, so as to highlight the ability of the quality evaluation model to recognize high-quality knowledge as much as possible.

On the basis of any of the foregoing embodiments, this embodiment provides a specific method for acquiring samples of knowledge contents for step 201 or step 301, including internal knowledge and external knowledge of the enterprise, and efficiently selects positive and negative samples from the deeply understood internal knowledge of the enterprise by means of internal knowledge screening rules that may be executed automatically, which solves the problems of low efficiency and high efficiency caused by manual annotation as much as possible while broadening the source channels of samples of knowledge contents.

In order to deepen understanding, embodiments of the present disclosure further provides a specific implementation scheme in combination with the actual needs of providing knowledge recommendations for employees in the enterprise, specifically including model construction, model usage, and continuous model optimization:

I. Model Construction

1. The Server Collects Samples of Knowledge Contents:

Regarding the internal knowledge of the enterprise: according to the types and characteristics of knowledge documents deposited in the enterprise, the types of articles that are not suitable for recommendation, such as "job schedules", "meeting minutes", and "bug checking records", and the content forms that are not suitable for recommendation, such as too short content, attachment content, and no obvious paragraphs, are found, some access rules are manually summarized, positive and negative samples of quality access are automatically constructed through the rules, for example, a positive sample screening rule for the internal knowledge of the enterprise may be expressed as: the title contains the word "summary" and the attachment format is a document format.

Regarding the external knowledge of the enterprise: articles in high-quality article sites related to the field of the enterprise are selected as positive samples, and articles in low-quality article sites are selected as negative samples. In addition, because a vertical site with relatively poor quality also has relatively high-quality articles, in order to avoid the influence of this part on the effect of the model, the articles with a large collection and reading quantity in this site are deleted from the negative samples.

2. The Server Extracts Statistical Features, Semantic Features and Image Features Respectively from the Samples of Knowledge Contents:

The statistical features comprise: a) title features: the length of title characters, the length of title segmentation, whether the title contains punctuation marks, whether the title contains special symbols, the number of vocabulary contained in the title in the current field of the enterprise, the number of digits contained in the title, and the number of English words in the title; b) body text features: the length of body characters, the length of body segmentation, the number of body sentences, the number of short sentences in the body, the length of the longest sentence in the body, the number of vocabulary contained in the body in the current field of the enterprise, and the proportion of Chinese and English in the body; and c) body structure features: the number of images in the body, the number of paragraphs in the body, the number of subtitles in the body, the number of bold texts in the body, whether the body has a catalog, the number of tables in the body, the number of formulas in the body, and the number of code libraries in the body.

The semantic features comprise: a) complete title semantic features and segmented title semantic features: emotional tendency of the title, sensitivity of the title to pornography and politics, smoothness score of the title, and whether the title has wrongly written or mispronounced characters; and b) complete sentence semantic features and segmented sentence semantic features: emotional tendency of the body, sensitivity of the body to pornography and politics, smoothness score of the longest sentence in the body, average smoothness score of all sentences in the body, whether the body has wrongly written or mispronounced characters, distribution of body topics, and the degree of matching between the body and the title.

The image features comprise: average image quality score (including sharpness and completeness), and the degree of matching between the image content and the body.

3. The Server Constructs a Quality Evaluation Model According to the Features:

Regarding the statistical features: the title statistical features of the internal knowledge samples of the enterprise and the title statistical features of the external knowledge samples of the enterprise are fused by a fully connected layer to obtain title statistical features; the body text statistical features of the internal knowledge samples of the enterprise and the body text statistical features of the external knowledge samples of the enterprise are fused by a fully connected layer to obtain body text statistical features; the body structure statistical features of the internal knowledge samples of the enterprise and the body structure statistical features of the external knowledge samples of the enterprise are fused by a fully connected layer to obtain body structure statistical features; and the title statistical features, the body text statistical features, and the body structure statistical features are connected to obtain a statistical feature fusion vector.

Regarding the semantic features: for the title, a word vector representation is obtained through an embedding layer after the title is segmented, and then a title semantic feature vector is obtained through a Bi-LSTM; for the body, a hierarchical structure is used to segment the body into sentences, a vector representation of each sentence is obtained in a process similar to that for the title, and then a final body semantic feature vector is obtained through the Bi-LSTM based on the sentences.

Regarding the image features: the average image quality score and the degree of matching between the image content and the body are respectively converted into vectors, and the vectors are fused by a fully connected layer to obtain an image feature vector.

Finally, the statistical feature vector, the title semantic feature vector, the body semantic feature vector, and the image feature vector are fused by a fully connected layer, and a quality scoring model is obtained after training. During the training process, the initial samples of knowledge contents is divided into a training set and a verification set, the initial model is trained after feature extraction and verified on the verification set, and the trained model with the best effect on the verification set is used as the quality scoring model.

II. Model Usage

The internal/external applied knowledge documents of the enterprise are input into the trained quality scoring model after feature extraction to obtain actual quality scores.

Specifically, the usage methods are slightly different for different parts of the system:

For a manual selection platform, the documents are selected from high to low quality scores to increase the manual selection speed; and for an automatic recommendation system, a quality threshold (for example, under a 100-score system) may be set, and the document knowledge higher than the threshold is admitted into the recommendation system to control the overall quality of recommended content.

III. Continuous Model Optimization

1. Feedback Data Return:

For different parts of the system, the feedback data return is handled in different ways:

For the manual selection platform, the knowledge manually selected is collected as high-quality positive samples. For the automatic recommendation system, the feedback data mainly comes from user interaction behavior, and this part of data may be divided into two types: explicit and implicit. The explicit part comprises: the low-quality knowledge that users click on recommendation pages for feedback are used as explicit negative samples, and the knowledge collected by the users is used as explicit positive samples. The implicit part comprises: the knowledge that users averagely browse for a relatively long time is used as implicit positive samples, and the knowledge that has a large number of article clicks but a significantly lower average browsing time is used as implicit negative samples. When the model is trained, the explicit and implicit return samples are assigned with different weights. In addition, the degrees of interest of different users in different categories of knowledge may also be determined according to users' feedback, which in turn helps the pushing part to achieve accurate pushing.

2. Automatic Training and Update of the Model:

When the feedback return data accumulates to a certain magnitude and the ratio of the positive and negative samples reaches a predetermined range, the training set and the validation set are automatically constructed, the retraining of the quality model is triggered, and the new and old models are compared. If the accuracy of the new model is higher than that of the old model, online model update is automatically triggered.

That is, this part may be summarized as: third positive samples and third negative samples are determined according to quality feedback information for recommended knowledge, and the quality scoring model is updated according to the third positive samples and the third negative samples.

Figure 5:
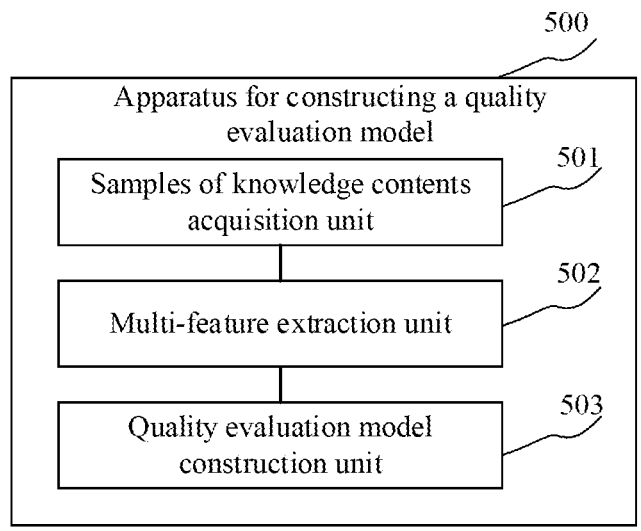
FIG. 5 is a schematic structural diagram of an embodiment of an apparatus for constructing a quality evaluation model according to the embodiments of present disclosure.

Further referring to FIG. 5, as an implementation of the method shown in the above figures, embodiments of the present disclosure provides an embodiment of an apparatus for a quality evaluation model. The embodiment of the apparatus corresponds to the embodiment of the method shown in FIG. 2, and the apparatus may be applied to various electronic devices.

As shown in FIG. 5, the apparatus 500 for constructing a quality evaluation model in this embodiment may comprise: a samples of knowledge contents acquisition unit 501, a multi-feature extraction unit 502, and a quality evaluation model construction unit 503. The samples of knowledge contents acquisition unit 501 is configured to acquire samples of knowledge contents, wherein the samples of knowledge contents comprises knowledge documents expressed in at least one form of texts, images, and tables; the multi-feature extraction unit 502 is configured to extract statistical features, semantic features, and image features respectively from the samples of knowledge contents; and the quality evaluation model construction unit 503 is configured to construct a quality evaluation model for knowledge according to the statistical features, the semantic features, and the image features.

In this embodiment, in the apparatus 500 for constructing a quality evaluation model: the specific processing of the samples of knowledge contents acquisition unit 501, the multi-feature extraction unit 502, and the quality evaluation model construction unit 503 and the technical effects brought about by them may be referred to the related descriptions in steps 201-203 in the corresponding embodiment of FIG. 2, respectively, and details are not described herein again.

In some optional implementation modes of this embodiment, the multi-feature extraction unit 502 may comprise: a statistical feature extraction subunit, configured to extract title statistical features, body text statistical features, and body structure statistical features from the samples of knowledge contents, and summarize same to obtain the statistical features; a semantic feature extraction subunit, configured to extract title semantic features and body semantic features from the samples of knowledge contents, and summarize same to obtain the semantic features; and an image feature extraction subunit, configured to extract morphological features, sharpness features, and meaning features from images contained in the samples of knowledge contents, and summarize same to obtain the image features.

In some optional implementation modes of this embodiment, the semantic feature extraction subunit may be further configured to: acquire a complete title of the samples of knowledge contents and each complete sentence in the body; segment the complete title and each complete sentence to obtain a segmented title and a segmented sentence; perform title semantic analysis on each word in the complete title and the segmented title respectively to obtain the title semantic features; and perform body semantic analysis on each word in each complete sentence and the segmented sentence respectively to obtain the body semantic features.

In some optional implementation modes of this embodiment, the quality evaluation model construction unit 503 may be further configured to: process the title statistical features, the body text statistical features, and the body structure statistical features through a first fully connected layer to obtain statistical feature vectors; reduce dimensions of the title semantic features and the body semantic features respectively, and process the dimension-reduced title semantic features and the dimension-reduced body semantic features by using a bi-directional long-short term memory to obtain title feature vectors and body feature vectors respectively; process, through a second fully connected layer, the statistical feature vectors, the title feature vectors, the body feature vectors, and image feature vectors obtained after conversion of the image features, to obtain a fusion vector; and construct the quality evaluation model for knowledge according to the fusion vector.

In some optional implementation modes of this embodiment, the samples of knowledge contents acquisition unit 501 may be further configured to: screen first positive samples and first negative samples from an internal knowledge base by means of preset internal knowledge screening rules, wherein the internal knowledge screening rules are abstractly obtained based on the differences between non-recorded internal knowledge and recorded internal knowledge; select second positive samples from an external authoritative knowledge base, and select second negative samples from an external non-authoritative knowledge base; use the first positive samples and the second positive samples as positive samples, use the first negative samples and the second negative samples as negative samples, and form the samples of knowledge contents with the positive samples and the negative samples in a preset ratio.

In some optional implementation modes of this embodiment, the apparatus 500 for constructing a quality evaluation model may further comprise: a mark adding unit, configured to add preset marks to the knowledge contents whose collection and reading quantities exceed preset quantities in the second negative samples; and an adjustment unit, configured to remove the knowledge contents added with the preset marks from the second negative samples and add the removed knowledge contents to the second positive samples.

In some optional implementation modes of this embodiment, the apparatus 500 for constructing a quality evaluation model may further comprise: an actual quality model evaluation unit, configured to evaluate the actual quality of newly generated knowledge contents by using the quality evaluation model; and a high-quality knowledge recommendation unit, configured to recommend the newly generated knowledge contents whose actual quality exceeds a preset quality as high-quality knowledge.

In some optional implementation modes of this embodiment, the apparatus 500 for constructing a quality evaluation model may further comprise: a third positive/negative sample determination unit, configured to determine third positive samples and third negative samples according to quality feedback information for recommended knowledge; and a quality evaluation model updating unit, configured to update the quality evaluation model according to the third positive samples and the third negative samples.

This embodiment exists as an apparatus embodiment corresponding to the above method embodiment. The apparatus for constructing a quality evaluation model according to this embodiment additionally uses semantic features and image features of knowledge contents to construct a more accurate quality evaluation model based on multi-dimensional features that characterize the actual quality of a knowledge, which may well discover some brief but very useful summary knowledge in an enterprise and may recommend high-quality knowledge more accurately for employees in the enterprise.

According to an embodiment of the present disclosure, embodiments of the present disclosure further provides an electronic device and a readable storage medium.

Figure 6:
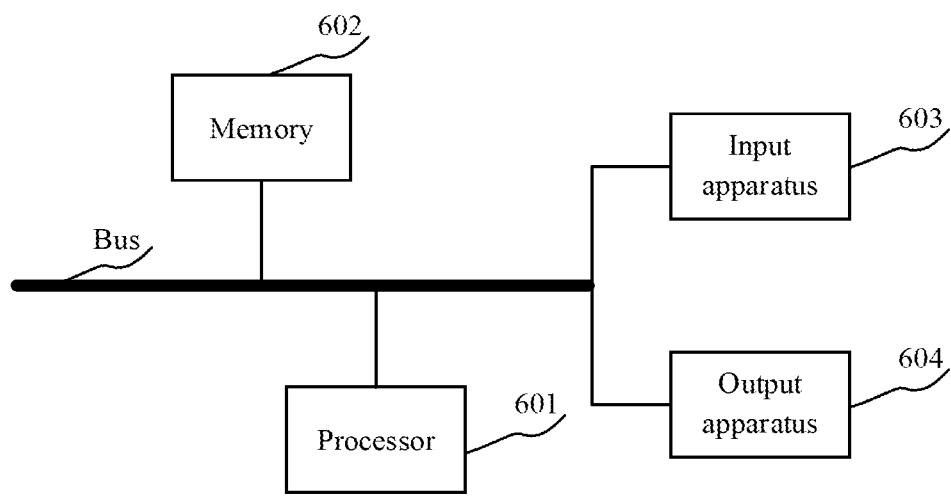
FIG. 6 is a block diagram of an electronic device suitable for implementing the method for constructing a quality evaluation model according to the embodiments of the present disclosure.

FIG. 6 shows a block diagram of an electronic device of a method for constructing a quality evaluation model suitable for implementing according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of embodiments of the present disclosure described and/or claimed herein.

As shown in FIG. 6, the electronic device comprises: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by embodiments of the present disclosure. The memory stores instructions executable by at least one processor, so that the at least one processor performs the method for constructing a quality evaluation model provided by embodiments of the present disclosure. The non-transitory computer readable storage medium of embodiments of the present disclosure stores computer instructions for causing a computer to perform the method for constructing a quality evaluation model provided by embodiments of the present disclosure.

The memory 602, as a non-transitory computer readable storage medium, may be used to store non-transitory software programs, non-transitory computer executable programs and modules, such as program instructions/modules corresponding to the method for constructing a quality evaluation model in the embodiments of the present disclosure (for example, the samples of knowledge contents acquisition unit 501, the multi-feature extraction unit 502, and the quality evaluation model construction unit 503 shown in FIG. 5). The processor 601 executes the non-transitory software programs, instructions, and modules stored in the memory 602 to execute various functional applications and data processing of the server, that is, to implement the method for constructing a quality evaluation model in the foregoing method embodiment.

The memory 602 may comprise a storage program area and a storage data area, where the storage program area may store an operating system and at least one function required application program; and the storage data area may store kinds of data created by the electronic device when executing the method for constructing a quality evaluation model, etc. In addition, the memory 602 may comprise a high-speed random access memory, and may also comprise a non-transitory memory, such as at least one magnetic disk storage device, a flash memory device, or other non-transitory solid-state storage devices. In some embodiments, the memory 602 may optionally comprise memories remotely provided with respect to the processor 601, and these remote memories may be connected to the electronic device of the method for constructing a quality evaluation model through a network. Examples of the above network comprise but are not limited to the Internet, intranet, local area network, mobile communication network, and combinations thereof.

The electronic device suitable for executing the method for constructing a quality evaluation model may further comprise: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for constructing a quality evaluation model, such as touch screen, keypad, mouse, trackpad, touchpad, pointing stick, one or more mouse buttons, trackball, joystick and other input apparatuses. The output apparatus 604 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), and the Internet.

The computer system may comprise a client and a server. The client and the server are generally far from each other and usually interact through the communication network. The relationship between the client and the server is generated by computer programs that run on the corresponding computer and have a client-server relationship with each other.

On the basis of the prior art, the solution provided by the embodiment of the present disclosure additionally uses semantic features and image features of knowledge contents to construct a more accurate quality evaluation model based on multi-dimensional features that characterize the actual quality of a knowledge, which may well discover some brief but very useful summary knowledge in an enterprise and may recommend high-quality knowledge more accurately for employees in the enterprise.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure may be achieved, no limitation is made herein.

The above specific embodiments do not constitute limitation on the protection scope of embodiments of the present disclosure. Those skilled in the art should understand that various modifications, combinations, sub-combinations and substitutions may be made according to design requirements and other factors. Any modification, equivalent replacement and improvement made within the spirit and principle of embodiments of the present disclosure shall be comprised in the protection scope of embodiments of the present disclosure.

What is claimed is:

1. A method for constructing a quality evaluation model, comprising:
    screening first positive samples and first negative samples from an internal knowledge base by means of preset internal knowledge screening rules, wherein the internal knowledge screening rules are abstractly obtained based on differences between non-recorded internal knowledge and recorded internal knowledge;
    selecting second positive samples from an external authoritative knowledge base, and selecting second negative samples from an external non-authoritative knowledge base; and
    using the first positive samples and the second positive samples as positive samples, using the first negative samples and the second negative samples as negative samples, and forming samples of knowledge contents with the positive samples and the negative samples in a preset ratio, wherein the samples of knowledge contents comprise knowledge documents expressed in at least one form of texts, images, and tables;
    extracting statistical features, semantic features, and image features respectively from the samples of knowledge contents; and
    constructing a quality evaluation model for knowledge according to the statistical features, the semantic features, and the image features.

2. The method according to claim 1, wherein the extracting comprises:
    extracting title statistical features, body text statistical features, and body structure statistical features from the samples of knowledge contents, and summarizing same to obtain the statistical features;
    extracting title semantic features and body semantic features from the samples of knowledge contents, and summarizing same to obtain the semantic features; and
    extracting morphological features, sharpness features, and meaning features from images contained in the samples of knowledge contents, and summarizing same to obtain the image features.

3. The method according to claim 2, wherein the extracting title semantic features and body semantic features from the samples of knowledge contents comprises:
    acquiring a complete title of the samples of knowledge contents and each complete sentence in a body of a document;
    segmenting the complete title and each complete sentence to obtain a segmented title and a segmented sentence;
    performing title semantic analysis on each word in the complete title and the segmented title respectively to obtain the title semantic features; and
    performing body semantic analysis on each word in each complete sentence and the segmented sentence respectively to obtain the body semantic features.

4. The method according to claim 2, wherein the constructing a quality evaluation model for knowledge comprises:
    processing the title statistical features, the body text statistical features, and the body structure statistical features through a first fully connected layer to obtain statistical feature vectors;
    reducing dimensions of the title semantic features and the body semantic features respectively, and processing the dimension-reduced title semantic features and the dimension-reduced body semantic features by using a bi-directional long-short term memory to obtain title feature vectors and body feature vectors respectively;
    processing, through a second fully connected layer, the statistical feature vectors, the title feature vectors, the body feature vectors, and image feature vectors obtained after conversion of the image features, to obtain a fusion vector; and constructing the quality evaluation model for knowledge according to the fusion vector.

5. The method according to claim 1, further comprising:
adding preset marks to knowledge contents whose collection and reading quantities exceed preset quantities in the second negative samples; and
removing the knowledge contents added with the preset marks from the second negative samples, and adding the removed knowledge contents to the second positive samples.

6. The method according to claim 1, further comprising:
evaluating the actual quality of newly generated knowledge contents by using the quality evaluation model; and
recommending the newly generated knowledge contents whose actual quality exceeds a preset quality as high-quality knowledge.

7. The method according to claim 6, further comprising:
determining third positive samples and third negative samples according to quality feedback information for recommended knowledge; and
updating the quality evaluation model according to the third positive samples and the third negative samples.

8. An electronic device, comprising:
at least one processor; and
a memory communicatively connected with the at least one processor; wherein,
the memory stores instructions executable by the at least one processor, and the instructions, when executed by the at least one processor, causes the at least one processor to perform an operation for constructing a quality evaluation model, comprising:
screening first positive samples and first negative samples from an internal knowledge base by means of preset internal knowledge screening rules, wherein the internal knowledge screening rules are abstractly obtained based on differences between non-recorded internal knowledge and recorded internal knowledge;
selecting second positive samples from an external authoritative knowledge base, and selecting second negative samples from an external non-authoritative knowledge base; and
using the first positive samples and the second positive samples as positive samples, using the first negative samples and the second negative samples as negative samples, and forming samples of knowledge contents with the positive samples and the negative samples in a preset ratio, wherein the samples of knowledge contents comprise knowledge documents expressed in at least one form of texts, images, and tables;
extracting statistical features, semantic features, and image features respectively from the samples of knowledge contents; and
constructing a quality evaluation model for knowledge according to the statistical features, the semantic features, and the image features.

9. The device according to claim 8, wherein the extracting comprises:
extracting title statistical features, body text statistical features, and body structure statistical features from the samples of knowledge contents, and summarizing same to obtain the statistical features;
extracting title semantic features and body semantic features from the samples of knowledge contents, and summarizing same to obtain the semantic features; and
extracting morphological features, sharpness features, and meaning features from images contained in the samples of knowledge contents, and summarizing same to obtain the image features.

10. The device according to claim 9, wherein the extracting title semantic features and body semantic features from the samples of knowledge contents comprises:
acquiring a complete title of the samples of knowledge contents and each complete sentence in a body of a document;
segmenting the complete title and each complete sentence to obtain a segmented title and a segmented sentence;
performing title semantic analysis on each word in the complete title and the segmented title respectively to obtain the title semantic features; and
performing body semantic analysis on each word in each complete sentence and the segmented sentence respectively to obtain the body semantic features.

11. The device according to claim 9, wherein the constructing a quality evaluation model for knowledge comprises:
processing the title statistical features, the body text statistical features, and the body structure statistical features through a first fully connected layer to obtain statistical feature vectors;
reducing dimensions of the title semantic features and the body semantic features respectively, and processing the dimension-reduced title semantic features and the dimension-reduced body semantic features by using a bi-directional long-short term memory to obtain title feature vectors and body feature vectors respectively;
processing, through a second fully connected layer, the statistical feature vectors, the title feature vectors, the body feature vectors, and image feature vectors obtained after conversion of the image features, to obtain a fusion vector; and
constructing the quality evaluation model for knowledge according to the fusion vector.

* * * * *